United States Patent
Hösle

(10) Patent No.: US 6,344,011 B1
(45) Date of Patent: Feb. 5, 2002

(54) BOWL MILL TRANSMISSION

(75) Inventor: Helmut Hösle, Diedorf (DE)

(73) Assignee: RENK Aktiengesellschaft, Augsburg (DE)

( * ) Notice: Subject to any disclaimer, the term of this patent is extended or adjusted under 35 U.S.C. 154(b) by 0 days.

(21) Appl. No.: 09/552,120

(22) Filed: Apr. 19, 2000

(30) Foreign Application Priority Data

Apr. 19, 1999 (DE) ........................... 199 17 608

(51) Int. Cl.⁷ ............................................. F16H 57/08
(52) U.S. Cl. ..................... 475/343; 241/110; 241/117
(58) Field of Search ..................... 475/343, 344; 241/110, 117

(56) References Cited

U.S. PATENT DOCUMENTS

| | | | |
|---|---|---|---|
| 3,339,853 A | * | 9/1967 | Mischaniski ............. 241/110 |
| 4,210,291 A | * | 7/1980 | Kienast ................. 241/110 |
| 4,471,671 A | * | 9/1984 | Sigg ..................... 74/801 |
| 4,572,442 A | * | 2/1986 | Sigg ..................... 241/117 |
| 4,730,789 A | * | 3/1988 | Geiger .................. 241/69 |

FOREIGN PATENT DOCUMENTS

| | | | | |
|---|---|---|---|---|
| DE | 3226816 | * | 1/1984 | ............. 241/117 |
| DE | 3302049 | * | 7/1984 | ........... 241/101.2 |

OTHER PUBLICATIONS

Article appearing in Zement–Kalk–Gips, dated 1981, 3 pages.

* cited by examiner

Primary Examiner—Sherry Estremsky
Assistant Examiner—Tisha D. Lewis
(74) Attorney, Agent, or Firm—Cohen, Pontani, Lieberman & Pavane

(57) ABSTRACT

A bowl mill transmission which has a high overall transmission ratio with a large output torque, is of compact construction and is simple to assemble. The transmission includes a vertically arranged bevel-gear stage for the power input and a multi-stage power-splitting epicyclic transmission arrangement for power output into a thrust ring of the bowl mill.

16 Claims, 1 Drawing Sheet

BOWL MILL TRANSMISSION

BACKGROUND OF THE INVENTION

1. Field of the Invention

The present invention relates to bowl mill transmissions, and particularly to a bowl mill transmission with a vertically arranged bevel-gear stage for power input and a multi-stage epicyclic transmission arrangement for power input to a thrust ring of a bowl-mill crusher.

2. Description of the Related Art

The invention is based on bowl mills which are driven by vertical bevel-gear transmissions.

The prior art includes drives of this kind (e.g., Renk Tacke company publication Kegelrad-Planetengetriebe KPAV fürvertikale Wälzmühlen [Epicyclic bevel-gear transmissions for vertical roller mills]) in which the bevel-gear stage outputs power into the sun gear of an epicyclic transmission with a fixed annulus. In such transmissions, power output to the grinding bowl is via the planet carrier, which accommodates a plurality of planet gears for power transmission.

The grinding process in such mills requires high power transmission to the grinding stock at low speeds of rotation and high torque. The high transmission ratios required for this purpose are limited by the maximum possible diameter of the transmission stage and the diameter of the horizontal bevel gear. The diameter of the epicyclic stage is limited by the transmission housing which passes the grinding forces into the mill foundation by direct force transmission.

Developments of such drives embody two epicyclic stages. Here, the bevel-gear transmission drives a first sun pinion of a first epicyclic transmission stage. A second epicyclic transmission stage is driven by means of a rotationally fixed connection of the planet carrier, which rotates in the fixed annulus, to a further sun gear, which is arranged axially above the first sun gear. This second epicyclic stage is arranged axially above and concentrically to the first. By way of a further planet carrier, which revolves in a further fixed annulus by means of its planet gears, which are provided for power splitting, it outputs power into the grinding bowl.

The prior-art transmissions consume high input power to move the large revolving masses. A considerable outlay for bearings is furthermore required and assembly of the many individual parts is difficult. Furthermore, the bearings installed in revolving planet carriers can be monitored only with extreme difficulty.

SUMMARY OF THE INVENTION

It is accordingly an object of the present invention to provide a transmission which has a high overall transmission ratio with a large output torque, is of compact construction, and is simple to assemble.

According to an aspect of the invention, this object is achieved by a bowl mill transmission that inputs power through a bevel-gear transmission stage and through a sun pinion into an epicyclic transmission arrangement in which the power is split. The power output is then summed in two annulus toothings of an annulus body.

In each of its various overall sizes, the transmission design according to the invention covers a broader power range than the prior art and extends the power spectrum upwards.

By virtue of the compact epicyclic-stage unit according to the invention, the transmission can to a very large extent be preassembled, making assembly easier.

While maintaining grinding performance, more compact plants with a significantly lower weight can be achieved with the transmission arrangement according to the invention.

By virtue of the advantageous drive configuration, the transmission according to the invention can be constructed on a modular basis.

With the advantageous integration of the power output stage into the interior of the thrust plate, it is possible to achieve lower overall heights by means of the invention.

By virtue of the advantageous drive configuration, the number of components is reduced, thereby allowing transmissions according to the invention to be produced at lower cost.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference numerals denote similar elements.

DETAILED DESCRIPTION OF THE PREFERRED EMBODIMENTS

Figure 1:
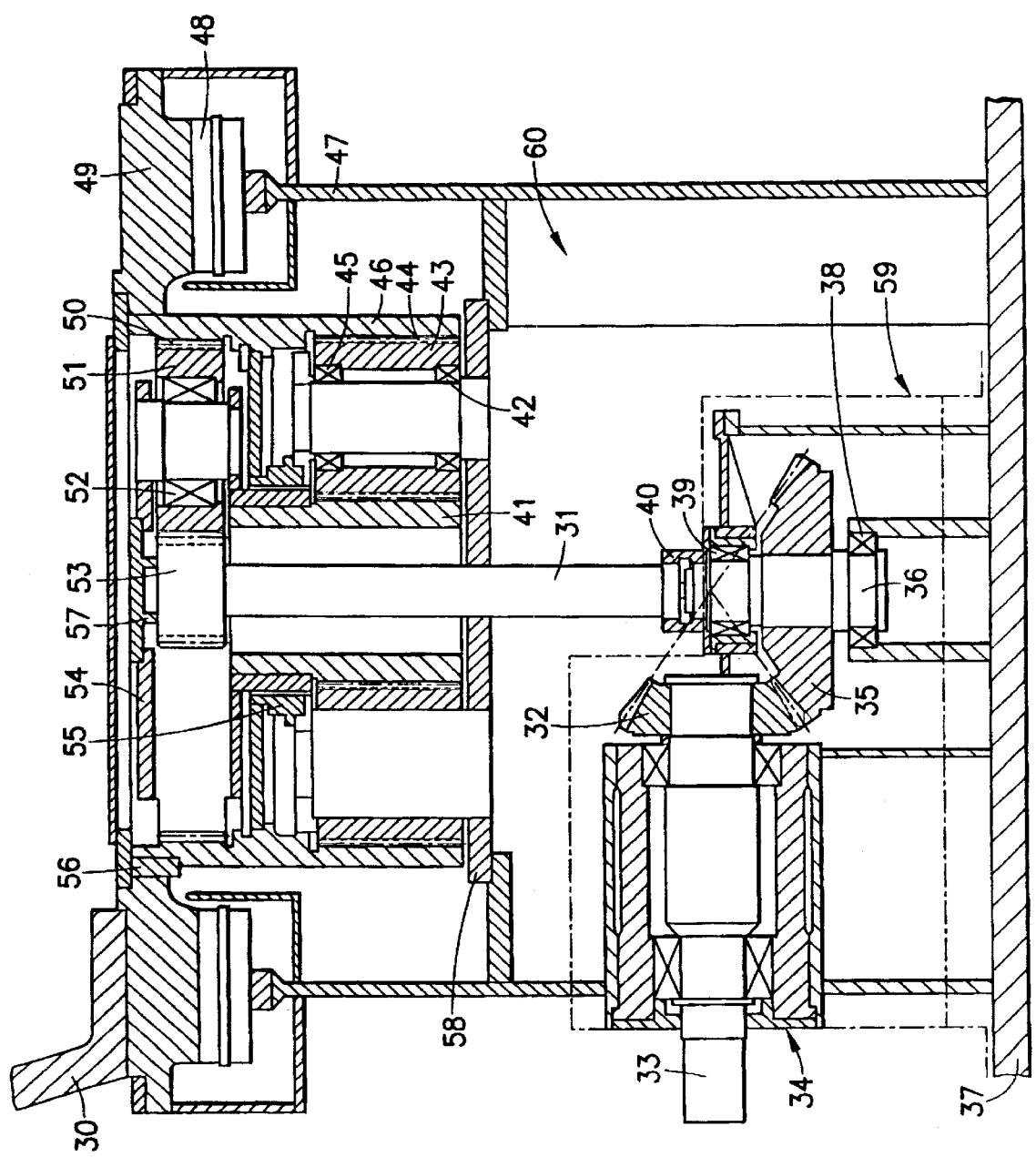
FIG. 1 shows a longitudinal section through a transmission according to the invention.

FIG. 1 shows a longitudinal section through a transmission according to the invention. It is constructed with its housing 47 on the base plate 37. Power input is by means of the drive shaft 33, which is connected at one end to an electric motor, for example, and carries a bevel gear 32 at its other end. The drive motor has not been shown here. The drive shaft 33 is installed with a complete bearing unit 34 in an insert in the housing 47. By means of tooth engagement with the horizontal bevel gear 35, the driving power is transmitted to the vertical bevel-gear shaft 36 of the angular transmission. To support the axial and radial forces resulting from the tooth engagement and the forces introduced via the sun-gear shaft 31, the vertical bevel-gear shaft 36 is held at its lower end by a bearing 38, which is secured on the base plate 37 by a housing part. A further bearing 39 is arranged in such a way at its upper shaft end that the bevel-gear shaft 36 projects somewhat and can be connected in a rotationally fixed manner to the sun-gear shaft 31 by a releasable coupling 40. This coupling 40 is preferably a toothed coupling.

The sun-gear shaft 31 is supported axially on the bevel-gear shaft 36 and, at the lower end, is guided in the radial direction by the coupling 40. By means of the sun pinion 53 attached to the other end of the sun-gear shaft 31, the sun pinion 53 being centered in an overhung manner between the planet gears 51, the sun-gear shaft 31 is guided radially at its upper shaft end. The revolving planet gears 51 are mounted rotatably in the planet carrier 54 by means of bearings 52. The planet carrier 54 is guided in the radial direction by means of the planet gears 51, which mesh with the annulus toothing 50, and its entire weight is supported on the sun-gear shaft 31 by means of a thrust bearing 57 bearing down above the sun pinion 53. The planet carrier 54 is connected in a rotationally fixed manner to the sun gear 41, which is arranged under it on the same axis of rotation. The sun gear 41 is bored out so that, once assembled with the planet carrier 54, it can be mounted over the preinstalled sun pinion 53. With its toothing, the sun gear 41 meshes with the planet gears 43, which are guided on spindles of the planet carrier 58 by means of bearings 42, 45. The planet carrier 58 is connected in a rotationally fixed manner to the housing partition. The power flows from the sun-gear shaft 31, via the sun pinion 53, into the revolving planet gears 51, which deliver some of the power via the annulus toothing 50 to the likewise revolving annulus body 46. The remainder of the power is introduced into the second epicyclic transmission stage 41, 43, 44, arranged below the first, via the planet carrier 54 which carries the planet gears 51 and is connected in a rotationally fixed manner to the sun gear 41. The planet gears 43 fixed to the housing mesh with the annulus toothing 44, which, like the annulus toothing 50 of the first epicyclic transmission stage 53, 51, 50, is attached in a rotationally fixed manner to the annulus body 46. By means of these toothings 44, 50, the component power flows are summed in the annulus body 46, which is connected by a shrink fit and additional keys 56 to the thrust ring 49 in the interior of the latter. Power output from the annulus body 46 takes place directly into the thrust ring 49.

The bowl mill 30 is mounted on the thrust ring 49. The very large grinding forces which act in the axial direction on the thrust ring 49 are introduced by means of thrust bearings 48 into the housing 47, from where they are introduced into the foundation by direct force transmission via the base plate 37. The thrust bearings 48 are embodied as hydrodynamic or hydrostatic bearings or as a combination of the two types of bearing, depending on the size of the mill and the grinding pressure which arises.

The thrust ring 49 with the bowl mill 30 arranged on it is supported radially by the annulus body 46, which is guided on the inside by a bearing 55 via various intermediate washers. The bearing 55 is connected to the housing 47 by the planet carrier 58 of the lower epicyclic transmission stage 41, 43, 44, the planet carrier 58 being fixed to the housing 47. Oil sump lubrication is provided for the lower epicyclic transmission stage 41, 43, 44 with the planet gears 43 fixed to the housing. The operation of the bearings 42, 45 of these planet gears 43 fixed to the housing can be monitored in a simple manner by measurements of structure-borne noise.

In another variant (not shown) of the housing, a complete module 59 of the bevel-gear transmission stage 32, 35 is provided with its own, vertical housing secured on the base plate 37.

A complete module of this kind can be inserted through a tunnel leading radially into the housing 47 and can be positioned under the raised sun-gear shaft 31.

By lowering the shaft 31 with the sun pinion 53, which, as with the process of raising, is performed from above by means of lifting gear, the sun-gear shaft 31 is connected to the bevel-gear shaft 36 by the coupling 40.

In another design configuration, such a module 59 of the bevel-gear transmission stage 32, 35 includes a flanged housing 60. This flanged housing is flanged as a compact unit to the housing partition beneath the second epicyclic transmission stage 41, 43, 44, and the coupling 40 connects the bevel-gear shaft 36 to the sun-gear shaft 31.

The vertical housing 59 and the flanged housing 60 are of multi-part design and also allow partial disassembly after installation.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps,which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A bowl mill transmission, comprising: a thrust ring; a housing; a vertically arranged bevel-gear stage for power input; and a multi-stage epicyclic transmission arrangement for power output to the thrust ring, the epicyclic transmission arrangement including a sun pinion and an annulus body having at least two annulus toothings, the bevel-gear transmission being arranged to input power via the sun pinion into the epicyclic transmission arrangement which is configured so that the power is initially split and subsequently power output is summed in the at least two annulus toothings of the annulus body.

2. A bowl mill transmission according to claim 1, wherein the epicyclic transmission arrangement includes a first epicyclic transmission stage having one of the annulus toothings and first planet gears mounted in a first, revolving planet carrier, and a second epicyclic transmission stage having a sun gear fixed to the planet carrier and second planet gears mounted in a second planet carrier rotationally fixed in the housing, part of the power being passed into the annulus toothing of the first epicyclic transmission stage via the first planet gears mounted in the first revolving planet carrier, another part of the power being passed into the second epicyclic transmission stage via the sun gear which is rotationally fixed to the planet carrier and the sun gear being arranged to output power via the second planet gears mounted in the second planet carrier into another of the annulus toothings arranged on the annulus body, the annulus body being rotationally fixed to the thrust ring.

3. A bowl mill transmission according to claim 1, wherein the bevel-gear stage is couplable to and decouplable from the epicyclic transmission arrangement as a complete unit without removing the epicyclic transmission arrangement.

4. A bowl mill transmission according to claim 3, wherein the bevel-gear stage includes a sun-gear shaft releasably connected to a vertical bevel-gear shaft so as to be rotationally fixed to the sun-gear shaft.

5. A bowl mill transmission according to claim 4, wherein the rotationally fixed connection between the sun-gear shaft and the vertical bevel-gear shaft is a toothed coupling.

6. A bowl mill transmission according to claim 3, wherein the housing has a tunnel, the complete bevel-gear stage being laterally insertable as a unit into the tunnel in a housing.

7. A bowl mill transmission according to claim 3, wherein the bevel-gear stage has a housing flanged to the housing of the bowl mill as a complete unit.

8. A bowl mill transmission according to claim 7, wherein the housing of the bevel-gear stage comprises several separable parts.

9. A bowl mill transmission according to claim 1, wherein the annulus body is rotationally fixed by frictional engagement to the thrust ring by a press fit.

10. A bowl mill transmission according to claim 9, wherein the annulus body has keys for transmitting torque in addition to the press fit.

11. A bowl mill transmission according to claim 1, wherein a radial extent of the annulus body is arranged within the thrust ring.

12. A bowl mill transmission according to claim 1, wherein the annulus body is guided in the radial direction by a bearing which is supported on the second planet gear carrier.

13. A bowl mill transmission according to claim 12, wherein the bearing is a sliding contact bearing.

14. A bowl mill transmission according to claim 1, wherein the bevel-gear stage includes a sun-gear shaft and a bevel-gear having a shaft, the shaft of the sun-gear being seated on the shaft of the bevel-gear, and further comprising a thrust bearing arranged so as to support weight of the first planet carrier and the first planet gears on the shaft of the sun-gear.

15. A bowl mill transmission according to claim 1, and further comprising an oil sump for lubricating the epicyclic transmission arrangement.

16. A bowl mill transmission according to claim 1, and further comprising means for monitoring bearings of the second epicyclic transmission stage.

* * * * *